United States Patent
He et al.

(10) Patent No.: US 11,595,125 B2
(45) Date of Patent: Feb. 28, 2023

(54) TRANSCEIVER AGNOSTIC GOSNR MEASUREMENT

(71) Applicant: EXFO Inc., Quebec (CA)

(72) Inventors: Gang He, Quebec (CA); Daniel Gariepy, Quebec (CA)

(73) Assignee: EXFO Inc., Quebec (CA)

(*) Notice: Subject to any disclaimer, the term of this patent is extended or adjusted under 35 U.S.C. 154(b) by 207 days.

(21) Appl. No.: 17/183,415

(22) Filed: Feb. 24, 2021

(65) Prior Publication Data

US 2021/0273722 A1 Sep. 2, 2021

Related U.S. Application Data

(60) Provisional application No. 63/044,667, filed on Jun. 26, 2020, provisional application No. 62/983,038, filed on Feb. 28, 2020.

(51) Int. Cl.
| | | |
|---|---|---|
| *H04B 17/00* | (2015.01) | |
| *H04B 10/079* | (2013.01) | |
| *H04B 10/073* | (2013.01) | |

(52) U.S. Cl.
CPC ... *H04B 10/07953* (2013.01); *H04B 10/0731* (2013.01); *H04B 10/07955* (2013.01)

(58) Field of Classification Search
CPC .......... H04B 10/07953; H04B 10/0731; H04B 10/07955
USPC .......................................................... 398/26
See application file for complete search history.

(56) References Cited

U.S. PATENT DOCUMENTS

| | | |
|---|---|---|
| 8,364,034 B2 | 1/2013 | He et al. |
| 8,787,753 B2 | 7/2014 | Gariepy et al. |
| 9,112,604 B2 | 8/2015 | Gariepy et al. |
| 9,596,027 B2 | 3/2017 | He et al. |
| 10,128,975 B2 | 11/2018 | He et al. |
| 2013/0028597 A1 | 1/2013 | Ye et al. |
| 2016/0072579 A1 | 3/2016 | Schroeder |
| 2020/0076501 A1* | 3/2020 | Searcy ................... H04B 10/58 |
| 2020/0412448 A1* | 12/2020 | Flettner .............. H04B 10/2543 |

(Continued)

OTHER PUBLICATIONS

Mateo et al., "Nonlinear Characterization of Fiber Optic Submarine Cables", ECOC 2017, paper Th.2.E.4.

(Continued)

*Primary Examiner* — Mohammad R Sedighian
(74) *Attorney, Agent, or Firm* — Helene Chotard

(57) ABSTRACT

There is herein provided a method for measuring the GOSNR that can be implemented using commercial-grade transceivers and which accounts for linear optical impairments (e.g. PMD, PDL and CD) and transceiver intrinsic impairments. The method may be implemented using an Optical Spectrum Analyzer (OSA) and either the system transceivers or other commercial-grade transceivers. The proposed measurement method is based on mixed optical and electronic technologies, using an OSA and a transceiver pair. By measuring a signal quality metric $Q_m$ and the OSNR under varied power and ASE noise conditions, a constant value $R_{BW}$ that relates the GOSNR to the signal quality metric $Q_m$ is derived. The GOSNR is then obtained from these results.

23 Claims, 7 Drawing Sheets

(56) References Cited

U.S. PATENT DOCUMENTS

2021/0111794 A1* 4/2021 Huang ............... H04B 10/2507
2022/0353003 A1* 11/2022 Burtsev ............ H04B 10/07953

OTHER PUBLICATIONS

Poggiolini, "The GN Model of Non-Linear Propagation in Uncompensated Coherent Optical Systems," Journal of Lightwave Technology, vol. 30, No. 24, pp. 3857-3879, Dec. 2012.
Sinkin et al., "Effective signal to noise ratio performance metric for dispersion-uncompensated links," in 2015 European Conference on Optical Communication (ECOC), 2015, pp. 1-3.
Kamalov et al., "Lessons Learned from Open Line System Deployments," OFC 2017, M2E.2.
Gaudette et al., "Open Undersea Cable Systems for Cloud Scale Operation," OFC 2017, M2E.1.
Pecci et al., "Experimental characterization of submarine "open cable" using Gaussian-Noise model and OSNRWET parameter". Proc. of OFC 2017, M2E.4, 3 pages (2017).
Vacondio et al., "On Nonlinear Distortions of Highly Dispersive Optical Coherent Systems", Optics Express, vol. 20, No. 2, pp. 1022-1032 (Jan. 16, 2012).
Pecci et al. "Design of Submarine "Open" cables", Proc. of OFC 2018, M1D.4, 3 pages (2018).
Gariepy et al., "Novel OSNR Measurement Techniques Based on Optical Spectrum Analysis and Their Application to Coherent-Detection Systems," J. Lightwave Technol., vol. 37, No. 2, pp. 562-570 (Jan. 15, 2019).

* cited by examiner

TRANSCEIVER AGNOSTIC GOSNR MEASUREMENT

TECHNICAL FIELD

The present description generally relates to the determination of a linear and nonlinear noise parameter characterizing an optical communication link, and more particularly to the determination of the Generalized Optical Signal to Noise Ratio (GOSNR).

BACKGROUND

Network operators increasingly adopt practices of network function disaggregation, including sourcing the terminal equipment (transceivers) and the optical transmission link (including amplifiers and ROADMs) from different vendors. It has thus become increasingly important to characterize the optical link performance. Increased use of coherent receivers operating without optical dispersion compensation has led to the definition of the concept of a Generalized Optical Signal to Noise Ratio (GOSNR) which combines in a single metric (i.e., the GOSNR), both the traditional $OSNR_{ASE}$ due to ASE noise from optical amplifiers, and the "nonlinear" $OSNR_{NL}$ due to nonlinear distortions. The GOSNR quantifies the linear and nonlinear noise accrued by a signal while passing through an optical link consisting of fiber spans and amplifiers. The GOSNR metric is particularly useful in disaggregated systems, where it is desirable to quantify the optical link performance independently of the terminal equipment.

There exist known methods in art for deriving the GOSNR using a pair of coherent transmitter and receiver (see P. Pecci et al., "Experimental Characterization of Submarine "Open Cable" using Gaussian-noise Model and $OSNR_{WET}$ Parameter," Proc. OFC 2017, M2E.4). In the method described in Pecci, the coherent transmitter/receiver pair is first characterized in a back-to-back (B2B) measurement, i.e., when the transmitter and receiver are directly connected to one another without optical fiber link impairments. In the back-to-back measurement, a signal quality metric $Q_{TRx}$ of the transmitter/receiver pair is measured as a function of the OSNR. This signal quality metric is referred to as $Q_{TRx-B2B}$ and can be either the Q-factor (obtained from a BER measurement at the receiver) or the signal-to-noise ratio (SNR) (electronically obtained directly from the receiver). Second, an end-to-end measurement is conducted with the optical transmission link connected. In the end-to-end measurement, the signal quality metric $Q_{TRx}$ is measured, as well as the corresponding OSNR. This signal quality metric is referred to as $Q_{TRx-E2E}$. As shown in FIG. 1, the GOSNR of the optical transmission link is determined by finding, on the back-to-back measurement curve (BTB), the OSNR value that corresponds to the measured signal quality metric $Q_{TRx}$.

Such GOSNR measurement methods have a dependence on performance metrics of the transceiver optics, electronics and digital signal processing. For repeatable and reproducible measurements, the procedure requires "golden" transceivers (as opposed to "commercial-grade" transceivers) for both back-to-back and the end-to-end measurements, i.e., transceivers having intrinsic Q that is one or two orders of magnitude higher than measured Q. Relying on rare and expensive golden transceivers is not very practical.

There is therefore a need for a transceiver-independent GOSNR measurement method that can use commercial-grade transceivers to perform the measurement.

SUMMARY

There is herein provided a method for measuring the GOSNR that can be implemented using commercial-grade transceivers and which accounts for linear optical impairments (e.g. PMD, PDL and CD) and transceiver intrinsic impairments. The method may be implemented using an Optical Spectrum Analyzer (OSA) and either the system transceivers or other commercial-grade transceivers. The proposed measurement method is based on mixed optical and electronic technologies, using an OSA and a transceiver pair. By measuring a signal quality metric $Q_m$ and the OSNR under varied power and ASE noise conditions, a constant value $R_{BW}$ that relates the GOSNR to the signal quality metric $Q_m$ is derived. The GOSNR is then obtained from these results.

In accordance with one embodiment, there is provided a method for measuring at least one of the generalized signal quality metric $GQ_m$, the GOSNR characterizing linear and nonlinear noise over an optical communication link under test and the $OSNR_{NL}$ characterizing the nonlinear noise over the optical communication link under test. The method comprising:

at link operation conditions for which the $GQ_m$, the GOSNR and/or the $OSNR_{NL}$ is to be measured:
 while using a pair of transmitter and receiver connected to opposite ends of the optical communication link under test, recording values of signal quality metric $Q_{m\text{-}tot\text{-}1}$, and recording values of signal power Ps-1 and ASE-noise Optical Signal to Noise Ratio $OSNR_{ASE\text{-}1}$;
for at least two levels of signal power Ps-2 and Ps-3 that are different from the signal power Ps-1 of the link operation conditions:
 while using said pair of transmitter and receiver connected to opposite ends of the optical communication link under test, recording values of signal quality metric $Q_{m\text{-}tot\text{-}2}$, $Q_{m\text{-}tot\text{-}3}$;
 from values of signal quality metric recorded at varied signal power Ps-1, Ps-2 and Ps-3, deriving a value of a nonlinear contribution $Q_{NL\text{-}1}$ to the signal quality metric $Q_{m\text{-}tot\text{-}1}$, which result from non-linear noise in transmission over the optical transmission link; and
derive the $GQ_m$, the GOSNR and/or the $OSNR_{NL}$ from a constant value $R_{BW}$, said signal quality metric contribution $Q_{NL\text{-}1}$ and said ASE-noise OSNR $OSNR_{ASE\text{-}1}$.

In some embodiments, the constant value $R_{BW}$ is predetermined from a prior back-to-back calibration measurement.

In some other embodiments, the method further comprises:
while injecting additional ASE noise over the optical communication link under test:
 while using said pair of transmitter and receiver connected to opposite ends of the optical communication link under test, recording values of signal quality metric $Q_{m\text{-}tot\text{-}add}$ and ASE-noise OSNR $OSNR_{ASE\text{-}add}$; and
from recorded values of signal quality metric $Q_{m\text{-}tot\text{-}add}$ and recorded values of ASE-noise OSNR, deriving the constant value $R_{BW}$ that relates the GOSNR to the generalized signal quality metric GQ.

In accordance with another embodiment, there is provided a system for measuring at least one of the generalized signal quality metric ($GQ_m$), the Generalized Optical Signal to Noise Ratio (GOSNR) characterizing linear and nonlinear noise over an optical communication link under test and the nonlinear Optical Signal to Noise Ratio ($OSNR_{NL}$) characterizing the nonlinear noise over the optical communication link under test, the optical communication link under test having a transmitter end connected toward a transmitter and a receiver end connected toward a receiver. The system comprises:

a variable optical attenuator connected between the transmitter and the optical communication link to vary a level of signal power in the optical communication link;

an ASE source connected between the receiver end and the receiver, to inject additional ASE noise toward the receiver;

an optical spectrum analyzer connected between the receiver end and the receiver, to measure values of ASE-noise Optical Signal to Noise Ratio;

a processing unit configured for:
receiving values of signal quality metric $Q_{m\text{-}tot\text{-}1}$, signal power Ps-1 and ASE-noise Optical Signal to Noise Ratio $OSNR_{ASE\text{-}1}$ recorded on the optical communication link under test, at link operation conditions for which the $GQ_m$, the GOSNR and/or the $OSNR_{NL}$ is to be determined;

receiving values of signal quality metric Q, $Q_{m\text{-}tot}$ recorded for at least two levels of signal power Ps-2 and Ps-3 that are different from the signal power Ps-1 of the link operation conditions;

from values of signal quality metric recorded at varied signal power Ps-1, Ps-2 and Ps-3, deriving a value of a nonlinear contribution $Q_{NL\text{-}1}$ to the signal quality metric $Q_m$, which result from non-linear noise in transmission over the optical transmission link; and derive the $GQ_m$, the GOSNR and/or the $OSNR_{NL}$ from a constant value $R_{BW}$, said signal quality metric contribution $Q_{NL\text{-}1}$ and said ASE-noise OSNR $OSNR_{ASE\text{-}1}$.

In accordance with another embodiment, there is provided a non-transitory computer-readable storage medium comprising instructions that, when executed, cause a processor to perform the steps of:

receiving values of signal quality metric $Q_{m\text{-}tot\text{-}1}$, signal power Ps-1 and ASE-noise Optical Signal to Noise Ratio $OSNR_{ASE\text{-}1}$ recorded on the optical communication link under test, at link operation conditions for which a $GQ_m$, a GOSNR and/or a $OSNR_{NL}$ is to be determined;

receiving values of signal quality metric $Q_{m\text{-}tot\text{-}add}$ and ASE-noise OSNR $OSNR_{ASE\text{-}add}$ recorded on the optical communication link under test while injecting additional ASE noise using said ASE source;

receiving values of signal quality metric $Q_{m\text{-}tot\text{-}2}$, $Q_{m\text{-}tot\text{-}3}$ recorded for at least two levels of signal power Ps-2 and Ps-3 that are different from the signal power Ps-1 of the link operation conditions;

from recorded values $Q_{m\text{-}tot\text{-}1}$, $Q_{m\text{-}tot\text{-}add}$ of signal quality metric and recorded values $OSNR_{ASE\text{-}1}$ and $OSNR_{ASE\text{-}add}$ of ASE-noise OSNR, deriving a constant value $R_{BW}$ that relates the GOSNR to the signal quality metric GQ;

from values of signal quality metric recorded at varied signal power Ps-1, Ps-2 and Ps-3, deriving a value of a nonlinear contribution $Q_{NL\text{-}1}$ to the signal quality metric $Q_m$, which result from non-linear noise in transmission over the optical transmission link; and derive the $GQ_m$, the GOSNR and/or the $OSNR_{NL}$ from the constant value $R_{BW}$, said signal quality metric contribution $Q_{NL\text{-}1}$ and said ASE-noise OSNR $OSNR_{ASE\text{-}1}$.

In accordance with another embodiment, there is provided a computer program comprising instructions that, when executed by a processor, cause the processor to perform the steps of:

receiving values of signal quality metric $Q_{m\text{-}tot\text{-}1}$, signal power Ps-1 and ASE-noise Optical Signal to Noise Ratio $OSNR_{ASE\text{-}1}$ recorded on the optical communication link under test, at link operation conditions for which a $GQ_m$, a GOSNR and/or a $OSNR_{NL}$ is to be determined;

receiving values of signal quality metric $Q_{m\text{-}tot\text{-}add}$ and ASE-noise OSNR $OSNR_{ASE\text{-}add}$ recorded on the optical communication link under test while injecting additional ASE noise using said ASE source;

receiving values of signal quality metric $Q_{m\text{-}tot\text{-}2}$, $Q_{m\text{-}tot\text{-}3}$ recorded for at least two levels of signal power Ps-2 and Ps-3 that are different from the signal power Ps-1 of the link operation conditions;

from recorded values $Q_{m\text{-}tot\text{-}1}$, $Q_{m\text{-}tot\text{-}add}$ of signal quality metric and recorded values $OSNR_{ASE\text{-}1}$ and $OSNR_{ASE\text{-}add}$ of ASE-noise OSNR, deriving a constant value $R_{BW}$ that relates the GOSNR to the signal quality metric GQ;

from values of signal quality metric recorded at varied signal power Ps-1, Ps-2 and Ps-3, deriving a value of a nonlinear contribution $Q_{NL\text{-}1}$ to the signal quality metric $Q_m$, which result from non-linear noise in transmission over the optical transmission link; and derive the $GQ_m$, the GOSNR and/or the $OSNR_{NL}$ from the constant value $R_{BW}$, said signal quality metric contribution $Q_{NL\text{-}1}$ and said ASE-noise OSNR $OSNR_{ASE\text{-}1}$.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

Further features and advantages of the present invention will become apparent to those of ordinary skill in the art upon reading of the following description, taken in conjunction with the appended drawings.

Figure 1:
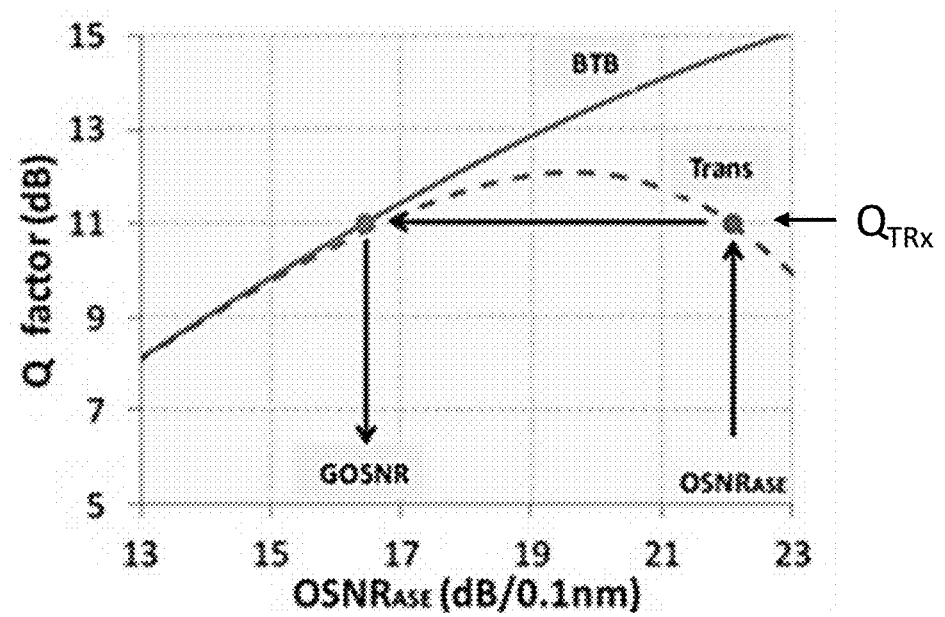
FIG. 1 is a graph illustrating a prior art method for deriving the GOSNR by inverting the back-to-back measurement curve of the Q factor as a function of the OSNR.

In the following description, similar features in the drawings have been given similar reference numerals and, to not unduly encumber the figures, some elements may not be indicated in some figures if they were already identified in a preceding figure. It should be understood herein that the elements of the drawings are not necessarily depicted to scale, since emphasis is placed upon clearly illustrating the elements and structures of the present embodiments.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

Optoelectronic Method

There is herein provided a GQm, GOSNR and/or $OSNR_{NL}$ measurement method that can be implemented using commercial-grade transceivers and which account for linear optical impairments (e.g. PMD, PDL and CD) and transceiver intrinsic impairments. The method may be implemented mainly using an Optical Spectrum Analyzer (OSA) and either the system transceivers or other commercial-grade transceivers.

General Description of the Method:

The proposed measurement method is based on mixed optical and electronic technologies, mainly using an OSA and a transceiver pair for measuring the $OSNR_{NL}$ and the $OSNR_{ASE}$. Then, the GOSNR may be obtained from $$1/GOSNR=1/OSNR_{ASE}+1/OSNR_{NL}.$$

Figure 2:
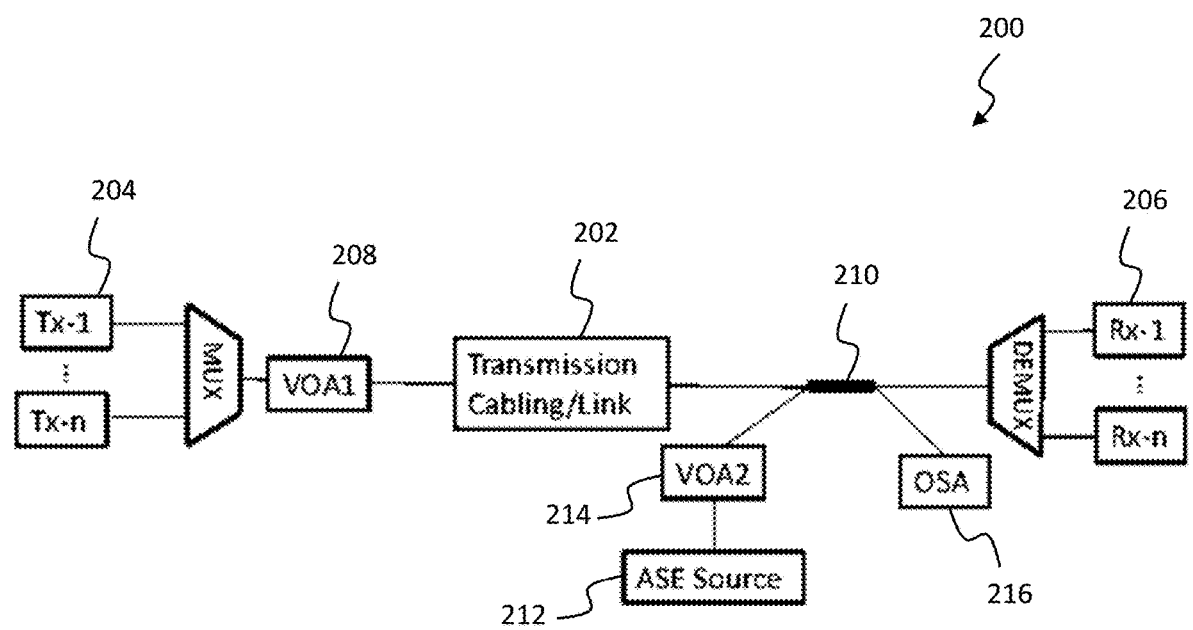
FIG. 2 is a block diagram illustrating a test system for measuring the GOSNR and/or the $OSNR_{NL}$, in accordance with one embodiment of the electro-optical method.

FIG. 2 is a block diagram illustrating a test system 200 for implementing the proposed method for measuring the GQm, the GOSNR and/or the $OSNR_{NL}$ of an optical transmission link under test 202, in accordance with one embodiment. The optical transmission link under test 202 has a transmitter end connected toward at least one transmitter 204 and a receiver end connected toward at least one receiver 206.

It will be understood that, as known in the art, each transmitter 204 and receiver 206 may be implemented as transceivers. The transmitter and receiver ends are defined only with reference to the direction of the signal of interest propagating in the optical communication link 202, which does not exclude compatibility with bidirectional communication over the optical communication link 202.

The test system 200 comprises a variable optical attenuator VOA1 204 on the transmitter end to vary a power level of the transmitted signal. On the receiver end, the test system 200 further comprises a 2×2 coupler 210, an ASE source 212, a variable optical attenuator VOA2 214 and an optical spectrum analyzer OSA 216. The 2×2 coupler 210 is connected in-line with the optical transmission link 202 to allow transmission therethrough. The ASE source 216 is connected to the 2×2 coupler 210 to inject ASE noise of variable power level toward the receiver end. The VOA2 214 is optional but may be used to vary a level of the injected ASE noise. The OSA 216 is also connected to the 2×2 coupler 210 to receive forwardly propagating light at the receiver end of the optical transmission link 202 to analyze an optical spectrum thereof.

In some embodiments, the transmitter 204 and receiver 206 used in the GOSNR measurement may consist of those of the transmission system intended for the optical transmission link under test. Such embodiments may be useful in system commissioning applications. In other embodiments, the transmitter 204 and receiver 206 may be any other transmitter/receiver pair (e.g. devices intended for testing and not necessarily destined to be used in the link under test). Such embodiments may be useful for use in open link testing applications. Such method may be implemented using a receiver 204 including a signal quality metric $Q_m$ measurement functionality, $Q_m$ representing either the electronic Q-factor or the electronic SNR.

The proposed method can be summarized as follows:

1. Record signal quality metric $Q_m$, signal power Ps and OSNR at operation conditions
2. Record signal quality metric $Q_m$ and OSNR with added ASE
3. Record signal quality metric $Q_m$, signal power Ps and OSNR with varied signal power
4. From 1) & 2), derive constant value $R_{BW}$ that relates OSNR to signal quality metric $Q_m$:

$$R_{BW}=GQ/GOSNR=Q_{ASE}/OSNR_{ASE}=Q_{NL}/OSNR_{NL}$$

5. From 3), discriminate nonlinear contribution $Q_{NL}$ to signal quality metric $Q_m$
6. Derive the GOSNR and/or $OSNR_{NL}$:

$$OSNR_{NL}=Q_{NL}/R_{BW}$$

$$GOSNR^{-1}=OSNR_{ASE}^{-1}+OSNR_{NL}^{-1}$$

Mathematical Expressions:

As mentioned hereinabove, the signal quality metric $Q_m$ may represent either the electronic Q-factor or the electronic SNR. In either case, the total $Q_m$ measured for a signal propagating over an optical communication link (end-to-end (E2E) measurement) is referred to herein as $Q_{m\text{-}tot}$ and can be decomposed as follows:

$$1/Q_{m\text{-}tot}=1/Q_{ASE}+1/Q_{NL}+1/Q_{TRx\text{-}intrinsic}+1/Q_{Rx\text{-}link} \qquad (1)$$

where $Q_{ASE}$ represents a contribution in the measured $Q_m$ (Q contribution) resulting from the cumulated ASE in transmission over the optical transmission link; $Q_{NL}$ is a Q contribution resulting from non-linear noise built in transmission over the optical transmission link; $Q_{TRx\text{-}Intrinsic}$ represents a Q contribution due to intrinsic transceiver impairments and electronic noise; and $Q_{Rx\text{-}Link}$ represents a Q contribution resulting from other residual linear link transmission impairments, such as CD, PDL and PMD, after digital signal processing compensation at the receiver. All Q metrics are in linear units.

$Q_{TRx\text{-}intrinsic}$ is composed of two terms, i.e. $Q_{TRx\text{-}Ps}$ that is linearly proportional to the signal power Ps and $Q_{TRx\text{-}C}$ that is a constant term, independent to the signal power Ps, such that:

$$1/Q_{TRx\text{-}intrinsic}=1/Q_{TRx\text{-}Ps}+1/Q_{TRx\text{-}C} \qquad (2)$$

Considering $Q_{Rx\text{-}link}$ is independent to Ps, equation (1) can be rewritten as $$1/Q_{m\text{-}tot}=1/GQ_m+1/Q_{TRx\text{-}Ps}+1/Q_{m\text{-}C}$$

$$1/Q_{m\text{-}tot}=1/[R_{BW}(1/GOSNR)]+1/Q_{TRx\text{-}Ps}+1/Q_{m\text{-}c} \qquad (3)$$

where $$1/Q_{m\text{-}C}=1/Q_{Rx\text{-}link}+1/Q_{TRx\text{-}C} \qquad (4)$$

And wherein the generalized Q metric, $GQ_m$ is defined as $$1/GQ_m = 1/Q_{ASE} + 1/Q_{NL} \quad (5)$$

The generalized optical signal to noise ratio (GOSNR) is defined as $$1/GOSNR = 1/OSNR_{ASE} + 1/OSNR_{NL} \quad (6)$$

And the ratio between equivalent noise bandwidths for $Q_m$ and OSNR is:

$$R_{BW} = GQ_m/GOSNR = Q_{ASE}/OSNR_{ASE} = Q_{NL}/OSNR_{NL} \quad (7)$$

Figure 3:
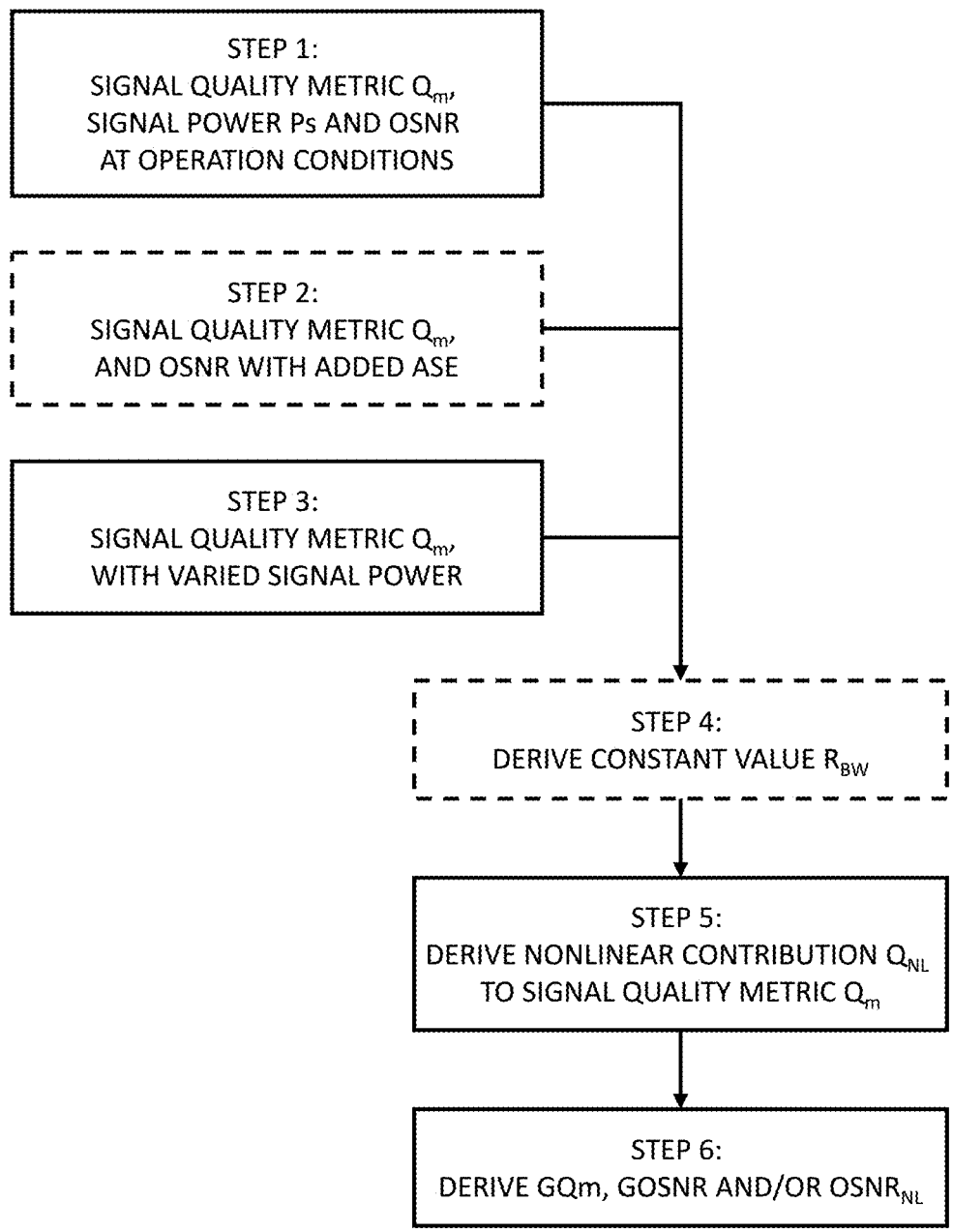
FIG. 3 is a flow chart of a method for measuring the $GQ_m$, the GOSNR and/or the $OSNR_{NL}$, in accordance with one embodiment.

Detailed Description of the Method:

Referring to FIG. 3, the proposed method for measuring the GQm, the GOSNR and/or the $OSNR_{NL}$ of an optical transmission link under test is described as follows:

Step 1—Record Signal Quality Metric Qm, Signal Power Ps and OSNR at Operation Conditions:

The total transmitted power $P_{Tx}$ and the power distribution between WDM channels are set to conditions for which the GQm, the GOSNR and/or the $OSNR_{NL}$ measurement is to be obtained, e.g., typical link operation conditions. More specifically, the total transmitted power $P_{Tx}$ is set to a first value $P_{Tx} = P_{Tx-1}$. The set power level $P_{Tx-1}$ may be generated using the transmitter module 204 in combination with VOA1 208. The ASE source 212 is turned off.

Under this condition 1, values of total signal quality metric, $Q_{m\text{-}tot\text{-}1}$ are measured and recorded for each WDM signal of interest. Values of signal quality metric $Q_m$ may be measured using the integrated signal quality metric measurement functionality of the receiver module 206.

The ASE OSNR, referred to as $OSNR_{ASE\text{-}1}$ and signal power, referred to as Ps-1 are also measured for each WDM signal of interest. Both these metrics may be measured using the OSA. The ASE OSNR may be measured using any method known in the art suitable for the optical signal being transmitted and received. For example, the conventional ASE interpolation method or the conventional signal turn-off method may be used. Or, for polarized signals, the conventional polarization-nulling method or other polarization-based methods (see, e.g., U.S. Pat. No. 8,787,753B2 to Gariepy et al. or U.S. Pat. No. 8,364,034B2 to He et al.) may be used. Or, for polarization-multiplexed signal, a reference-based method (see, e.g., U.S. Pat. No. 9,112,604B2 to Gariepy et al., which is hereby incorporated by reference) may be used.

From equation (3) and (7), we can define:

$$1/Q_{m\text{-}tot\text{-}1} = 1/(R_{BW} \, OSNR_{ASE\text{-}1}) + 1/Q_{NL\text{-}1} + 1/Q_{TRx\text{-}Ps\text{-}1} + 1/Q_{m\text{-}C} \quad (8)$$

Step 2—Record Signal Quality Metric $Q_m$ and OSNR with Added ASE:

The total transmitted power $P_{Tx}$ and the power distribution between WDM channels remains unchanged ($P_{Tx} = P_{Tx-1}$) compared to step 1, i.e., they are set to conditions for which the measurement is to be obtained, e.g., typical network operation conditions. The ASE source 212 is turned on to add ASE to the received signal. Optionally, the desired level of ASE may be set using VOA2 214.

Under this added ASE condition ("–add"), values of total signal quality metric, $Q_{m\text{-}tot\text{-}add}$, are measured for each WDM signal of interest using the receiver module 206, and measured values are recorded. Values of signal power, Ps-1, remains the same (i.e., Ps-add=Ps-1).

The ASE OSNR, referred to as $OSNR_{ASE\text{-}add}$ is also measured for each WDM signal of interest using the OSA 216 and any method known in the art.

Because the signal power is the same as in condition 1 (Ps-add=Ps-1), non-linear effects and the corresponding Q contribution $Q_{m\text{-}NL}$ resulting from non-linear noise is also the same ($Q_{m\text{-}NL\text{-}add} = Q_{m\text{-}NL\text{-}1}$, and $Q_{TRx\text{-}Ps\text{-}2} = Q_{TRx\text{-}Ps\text{-}1}$).

Then, from equation (3) and (7), we can define:

$$1/Q_{m\text{-}tot\text{-}add} = 1/(R_{BW} \, OSNR_{ASE\text{-}add}) + 1/Q_{NL\text{-}1} + 1/Q_{TRx\text{-}Ps\text{-}1} + 1/Q_{m\text{-}C} \quad (9)$$

Step 3—Record Signal Quality Metric $Q_m$, Signal Power and $OSNR_{ASE}$ with Varied Signal Power:

The ASE source is turned off. The total transmitted power $P_{Tx}$ is varied using VOA1 208 to set it to a second value ($P_{Tx} = P_{Tx-2}$) and a third value ($P_{Tx} = P_{Tx-3}$) that are different from the first value of step 1 ($P_{Tx-1} \neq P_{Tx-2} \neq P_{Tx-3}$). The power distribution between WDM channels may remain unchanged. For example, values of varied total transmitted power $P_{Tx-2}$ and $P_{Tx-3}$ may be selected to be within about ±1 dB from $P_{Tx-1}$, i.e., $P_{Tx-2} = P_{Tx-1} + 1$ dB and $P_{Tx-2} = P_{Tx-1} - 1$ dB. Other values are also possible.

Under each of these conditions (2 and 3), values of total signal quality metric, $Q_{m\text{-}tot\text{-}2}$ and $Q_{m\text{-}tot\text{-}3}$, are measured and recorded for each WDM signal of interest using the receiver module Rx. Signal power Ps-2 and Ps-3, as well as $OSNR_{ASE\text{-}2}$ and $OSNR_{ASE\text{-}3}$, can be measured and recorded using the OSA.

Again, from equation (3) and (7), we can define:

$$1/Q_{m\text{-}tot\text{-}2} = 1/(R_{BW} \, OSNR_{ASE\text{-}2}) + 1/Q_{NL\text{-}2} + 1/Q_{TRx\text{-}Ps\text{-}2} + 1/Q_{m\text{-}C} \quad (11a)$$

$$1/Q_{m\text{-}tot\text{-}3} = 1/(R_{BW} \, OSNR_{ASE\text{-}3}) + 1/Q_{NL\text{-}3} + 1/Q_{TRx\text{-}Ps\text{-}3} + 1/Q_{m\text{-}C} \quad (11b)$$

Step 4—Derive Constant Value $R_{BW}$:

From values recorded in steps 1 and 2, the constant value $R_{BW}$ that relates the OSNR to the signal quality metric $Q_m$ can be derived as follows.

Referring to equation (7), the constant value $R_{BW}$ is defined as:

$$R_{BW} = GQ/GOSNR = Q_{ASE}/OSNR_{ASE} = Q_{NL}/OSNR_{NL} \quad (7)$$

By subtracting equation (8) from equations (9), we find:

$$R_{BW} = (1/OSNR_{ASE\text{-}add} - 1/OSNR_{ASE\text{-}1})/(1/Q_{m\text{-}tot\text{-}add} - 1/Q_{m\text{-}tot\text{-}1}) \quad (10)$$

Step 5—Discriminate Nonlinear Contribution $Q_{NL}$ to Signal Quality Metric $Q_m$:

From the Gaussian noise model for uncompensated optical fibers (see P. Pecci et al., "Experimental Characterization of Submarine "Open Cable" using Gaussian-noise Model and OSNRWET Parameter," Proc. OFC 2017, M2E.4), we know that non-linear effect impairments generally increase proportionally to the square signal power and thus:

$$Q_{NL\text{-}1}/Q_{NL\text{-}2} = (PS2/Ps1)^2 \quad (12a)$$

$$Q_{NL\text{-}1}/Q_{NL\text{-}3} = (PS3/Ps1)^2 \quad (12b)$$

Knowing that $Q_{TRx\text{-}Ps}$ represents the term of $Q_{TRx\text{-}intrinsic}$ that is linearly proportion linearly proportional to the signal power Ps, we find:

$$Q_{TRx\text{-}Ps2}/Q_{TRx\text{-}Ps1} = PS2/PS1 \quad (13a)$$

$$Q_{TRx\text{-}Ps3}/Q_{TRx\text{-}Ps1} = PS3/PS1 \quad (13b)$$

Now, from values recorded in steps 1 and 3 and by combining equations (8), (11a), (11b), (12a), (13a) and (13b), values of $Q_{NL\text{-}1}$, $Q_{NL\text{-}2}$ and $Q_{NL\text{-}3}$ are derived.

By putting equations of 12a, 12b, 13a and 13b into equations of 8, 11a and 11b, it has $$1/Q_{NL-1} = 1/Q_{m-tot-1} - 1/(R_{RBW} OSNR_{ASE-1}) - 1/Q_{TRx-Ps1} - 1/Q_{TRx-C} \quad (14a)$$

$$(Ps2/Ps1)^2/Q_{NL-1} = 1/Q_{m-tot-2} - 1/(R_{RBW} OSNR_{ASE-2}) - (PS1/PS2)/Q_{TRx-Ps1} - 1/Q_{TRx-C} \quad (14b)$$

$$(Ps3/Ps1)^2/Q_{NL-1} = 1/Q_{m-tot-3} - 1/(R_{RBW} OSNR_{ASE-3}) - (PS1/PS3)/Q_{TRx-Ps1} - 1/Q_{TRx-C} \quad (14c)$$

For example, $Q_{NL-1}$ can be found as:

$$Q_{NL-1} = Cp/\{[(Ps1/Ps3)-1][\Delta_{2-1}(1/Q_{m-tot}) - \Delta_{2-1}(1/R_{BW}OSNR_{AES})] - [(Ps1/Ps2)-1][\Delta_{3-1}(1/Q_{m-tot}) - \Delta_{3-1}(1/R_{BW}OSNR_{AES})]\}$$

wherein $$Cp = [(Ps1/Ps3)-1][(Ps2/Ps1)^2 - 1] - [(Ps1/Ps2)-1][(Ps3/Ps1)^2 - 1]$$

$$\Delta_{2-1}(1/Q_{m-tot}) = 1/Q_{m-tot-2} - 1/Q_{m-tot-1}$$

$$\Delta_{3-1}(1/Q_{m-tot}) = 1/Q_{m-tot-3} - 1/Q_{m-tot-1}$$

$$\Delta_{2-1}(1/R_{BW}OSNR_{ASE}) = 1/R_{BW}OSNR_{ASE-2} - 1/R_{BW}OSNR_{ASE-1}$$

$$\Delta_{3-1}(1/R_{BW}OSNR_{ASE}) = 1/R_{BW}OSNR_{ASE-3} - 1/R_{BW}OSNR_{ASE-1}$$

and $Q_{NL-2}$ and $Q_{NL-3}$ then be found from equation (12a) and (12b).

It is noted that, in fact, from 7 independent equations, it is possible to derive all 7 unknown parameters of $Q_{NL-1}$, $Q_{NL-2}$, $Q_{NL-3}$, $Q_{TRx-Ps-1}$, $Q_{TRx-Ps-2}$, $Q_{TRx-Ps-3}$ and $Q_{m-C}$.

Step 6—Derive GQm, GOSNR and/or $OSNR_{NL-1}$:

From the constant value $R_{BW}$ derived in step 4 and the nonlinear contribution $Q_{NL-1}$ derived in step 5, the nonlinear OSNR may be found from equation (7):

$$OSNR_{NL-1} = Q_{NL-1}/R_{BW} \quad (14.1)$$

and the GOSNR corresponding to signal conditions 1 may be derived from equation (6):

$$GOSNR_1^{-1} = OSNR_{ASE-1}^{-1} + OSNR_{NL-1}^{-1}$$

Or, the GOSNR corresponding to signal conditions 1 may be derived more directly from the constant value $R_{BW}$ derived in step 4 and the nonlinear contribution $Q_{NL-1}$ derived in step 5, by combining equations (6) and (7):

$$1/GOSNR_1 = 1/OSNR_{ASE-1} + R_{BW}/Q_{NL-1} \quad (14.2)$$

$$1/GQ_{m-1} = 1/(R_{BW} OSNR_{ASE-1}) + 1/Q_{NL-1} \quad (14.3)$$

If needed for the specific application, the GOSNR or the generalized Q metric $GQ_m$ corresponding to signal conditions 2 and/or 3 may also be derived similarly:

$$1/GOSNR_2 = 1/OSNR_{ASE-2} + R_{BW}/Q_{NL-2} \quad (15.1)$$

$$1/GQ_{m-2} = 1/(R_{BW} OSNR_{ASE-2}) + 1/Q_{NL-2} \quad (15.2)$$

$$1/GOSNR_3 = 1/OSNR_{ASE-3} + R_{BW}/Q_{NL-3} \quad (15.3)$$

$$1/GQ_{m-3} = 1/(R_{BW} OSNR_{ASE-3}) + 1/Q_{NL-3} \quad (15.4)$$

And so is the $OSNR_{NL}$:

$$OSNR_{NL-2} = Q_{NL-2}/R_{BW} \quad (15.5)$$

$$OSNR_{NL-3} = Q_{NL-3}/R_{BW} \quad (15.6)$$

More specifically, if the Q metric is defined as the electronic Signal to Noise Ratio (SNR), the Generalized electronic Signal to Noise Ratio (GSNR) corresponding to signal conditions 2 and/or 3 may also be derived:

$$1/GSNR_1 = 1/(SNR_{ASE-1}) + 1/SNR_{NL-1} \quad (15.7)$$

$$1/GSNR_2 = 1/(SNR_{ASE-2}) + 1/SNR_{NL-2} \quad (15.8)$$

$$1/GSNR_3 = 1/(SNR_{ASE-3}) + 1/SNR_{NL-3} \quad (15.9)$$

where $$SNR_{RASE-1} = R_{BW} OSNR_{ASE-1} \quad (15.10)$$

$$SNR_{ASE-2} = R_{BW} OSNR_{ASE-2} \quad (15.11)$$

$$SNR_{ASE-3} = R_{BW} OSNR_{ASE-3} \quad (15.12)$$

Derived value(s) of $OSNR_{NL}$ ($OSNR_{NL-1}$, $OSNR_{NL-2}$, and/or $OSNR_{NL-3}$) and/or GOSNR ($GOSNR_1$, $GOSNR_2$ and/or $GOSNR_3$) and/or GSNR ($GSNR_1$, $GSNR_2$, $GSNR_3$) may then be output or made available in memory for later use.

It is noted that if the GOSNR is to be determined only for condition 1, i.e. signal power Ps=Ps1, then $OSNR_{ASE-2}$ and $OSNR_{ASE-2}$ do not need to be measured in step 3 and measuring the $OSNR_{ASE}$ for condition 1 is sufficient. In that case, in step 5, values of $Q_{NL-1}$, $Q_{NL-2}$ and $Q_{NL-3}$ may be derived from values recorded in steps 1 and 3, including signal power measurements Ps2 and Ps3, and the assumption that:

$$N_{ASE-1} = N_{ASE-2} = N_{ASE-3}$$

and therefore:

$$Ps2/Ps1 \approx OSNR_{ASE-2}/OSNR_{ASE-1}$$

$$Ps3/Ps1 \approx OSNR_{ASE-3}/OSNR_{ASE-1}$$

Such assumption may be used to reduce the number of measurements in step 3 because, in reality, only the signal power ratios are needed, which can be found either from the signal power ratio itself or the $OSNR_{ASE}$ ratios. More specifically, instead of measuring both the signal power and the $OSNR_{ASE}$ in step 3, either one or the other may be measured.

It is further noted that values of $Q_{TRx-Ps}$ and $Q_{m-C}$ which may optionally be derived in step 5, may be of interest in advanced characterization of overall transmission system. Therefore, in some embodiments, these values may further be output or made available in memory for later use.

As an alternative approach, for the case of using test transponders, the $R_{BW}$ of test transponders can be pre-calibrated in factory. In this case, only steps 1, 3, 5, 6 are required to be performed in the field in order to measure the GOSNR. The pre-calibration of $R_{BW}$ can be done by performing step 1, 2 and 4 (using equation 10), as mentioned before, through a back-to-back measurement of a calibration set-up, i.e., without an optical transmission link 202, shown in FIG. 2.

All-Optical Method

There is further provided method that can be implemented using commercial-grade transceivers and an Optical Spectrum Analyzer (OSA), and which is intrinsically independent to linear optical impairments (e.g., PMD, PDL and CD) and transceiver impairments. This method may advantageously be used for in-service monitoring applications after system turn-up.

General Description of Method:

The proposed measurement method is based on OSA acquisitions for measuring the $OSNR_{NL}$ and the $OSNR_{ASE}$. Then, the GOSNR may be obtained from $$1/GOSNR = 1/OSNR_{ASE} + 1/OSNR_{NL}.$$

It is based on a differential spectrum analysis between multiple optical spectrum traces acquired by an OSA at the receiver end of the optical transmission link, by varying the signal power in a controlled manner.

It was observed that, when increasing the signal power, stronger nonlinear effects result in greater signal spectral deformations.

Figure 4:
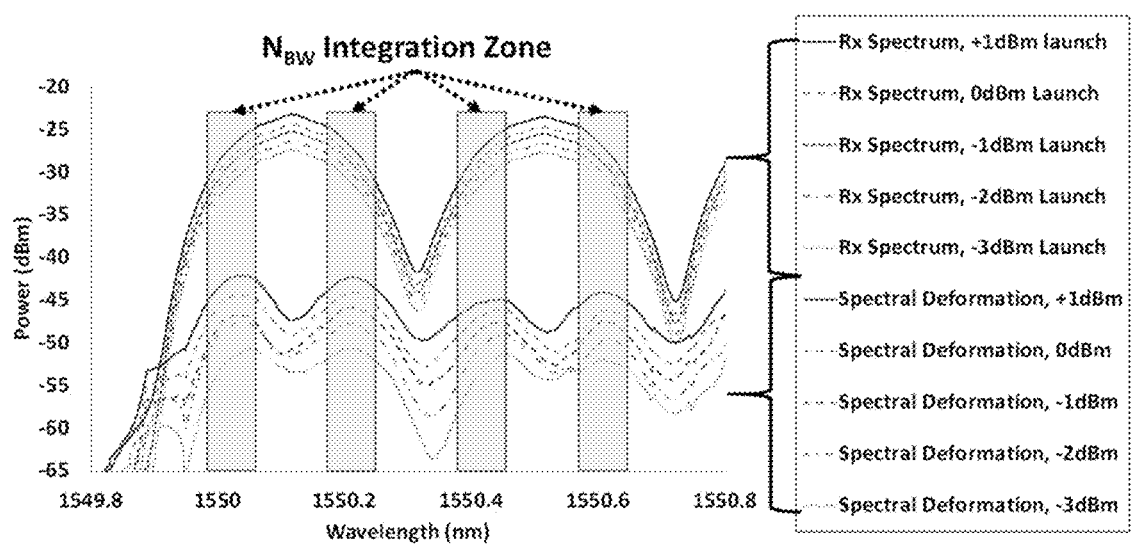
FIG. 4 is a graph illustrating a variation of the signal spectral deformation spectrum $\Delta S_{SD}(\lambda)$ with signal power, due to stronger nonlinear effects.

FIG. 4 shows how the signal spectral deformation spectrum $\Delta S_{SD}(\lambda)$ increases with the signal power due to stronger nonlinear effects. The spectral deformation after 8 spans is obtained by subtracting the reference spectrum from the received spectrum. The strength of the non-linearity noise increases with launch power. The vertical bars indicate the integration zone NBW used for calculating NSD.

It was found that the nonlinear OSNR, referred to as $OSNR_{NL}$, can be estimated from the signal spectrum deformation. From the signal deformation optical spectrum difference ($\Delta S_{SD}$), the $OSNR_{NL}$ may be determined by use of relations between $\Delta S_{SD}$, $N_{NL}$ and total signal power Ps. The ASE OSNR, referred to as $OSNR_{ASE}$, may be measured using the OSA by employing any method known in the art, such as the conventional ASE interpolation method, the conventional signal turn-off method, or a reference-based method for example.

Then, the GOSNR may be derived using equation (6):

$$1/GOSNR = 1/OSNR_{ASE} + 1/OSNR_{NL} \qquad (6)$$

Figure 5:
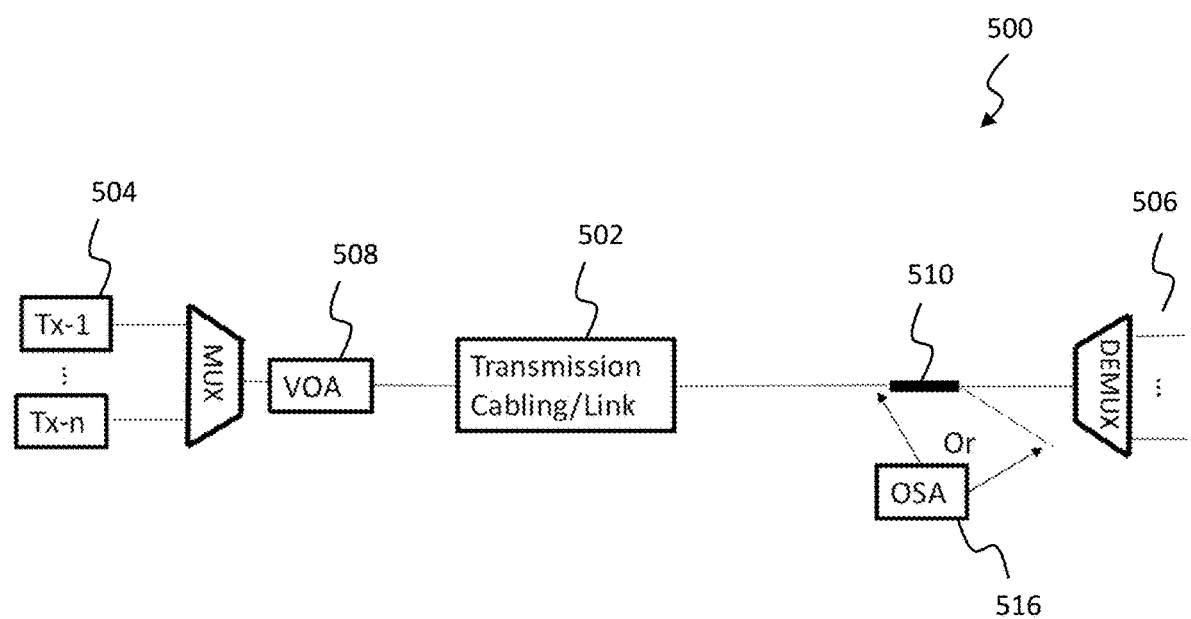
FIG. 5 is a block diagram illustrating a test system for measuring the GQm, the GOSNR and/or the $OSNR_{NL}$, in accordance with one embodiment of the all-optical method.

FIG. 5 is a block diagram illustrating a test system 500 for implementing the proposed GOSNR measurement method for measuring the GOSNR and/or the $OSNR_{NL}$ of an optical transmission link under test 502. The optical transmission link under test 502 has a transmitter end connected toward at least one transmitter 204 and a receiver end.

The test system 500 comprises a variable optical attenuator (VOA1) 508 on the transmitter end to vary and control a power level of the transmitted signal. On the receiver end, the test system 500 further comprises a tap coupler 510 and an optical spectrum analyzer OSA 516. The OSA 516 is connected to the tap coupler 516 to receive forwardly propagating light at the receiver end of the optical transmission link 502 to analyze an optical spectrum thereof.

In some embodiments, the transmitter 504 and receiver 506 used in the GOSNR measurement may consist of those of the transmission system intended for the optical transmission link under test. Such embodiments may be useful in system commissioning applications. In other embodiments, the transmitter 504 and receiver 506 may be any other transmitter/receiver pair (e.g. devices intended for testing and not necessarily destined to be used in the link under test). Such embodiments may be useful for use in open link testing applications.

At least three optical spectral traces are measured by the OSA 516 with varied signal power level.

Theory:

The signal deformation equivalent noise $N_{SD}$ can be obtained by integrating the non-spectrally uniform deformation noise $\Delta S_{SD}(\lambda)$ over a given spectral bandwidth $N_{BW}$ (in nm) and normalizing it to 0.1 nm:

$$N_{SD} = \frac{0.1}{N_{BW}} \int_{\lambda_1}^{\lambda_2} \Delta S_{SD}(\lambda) d\lambda, \text{ where } \lambda 2 - \lambda 1 = N_{BW} \qquad (16)$$

The spectral bandwidth $N_{BW}$ may correspond to the whole signal bandwidth or be determined by the relative power distribution of the signal peak, e.g. from −10 dB to −3 dB (as shown in FIG. 3).

The signal deformation optical signal to noise ratio $OSNR_{SD}$ can be derived as the relation between the total signal power $P_{TOT}$, individual channel signal power $P_{Ch}$ and the spectral bandwidth $N_{SD}$:

$$OSNR_{SD} = \frac{P_{Ch}}{P_{TOT} N_{SD}} \qquad (17)$$

The GOSNR is obtained by performing a typical commissioning characterization procedure, where it is possible to turn off transceivers for measuring the received $OSNR_{ASE}$ and to vary the launched power level in a controlled manner. The measurement can be done entirely in the optical domain with a commercial OSA.

For the general case where multiple optical spectrum traces are acquired by varying the signal power (for the general case where the nonlinear noise negligible in neither traces), we define a relative $OSNR_{NL}$ as:

$$\frac{1}{ROSNR_{NL}} = \frac{1}{OSNR_{NL2}} - \frac{1}{OSNR_{NL1}} \qquad (18)$$

wherein $OSNR_{NL1}$ and $OSNR_{NL2}$ are nonlinear OSNR corresponding to two different optical spectrum traces obtained by varying the signal power and wherein $OSNR_{SD}$ corresponds to the signal deformation between the two optical spectrum traces.

Based on previous observations that the $OSNR_{NL}$ is related to $OSNR_{SD}$ (see D. Gariepy, S. Searcy, G. He, S. Tibuleac, M. Leclerc, and P. Gosselin-Badaroudine, "Novel OSNR Measurement Techniques Based on Optical Spectrum Analysis and Their Application to Coherent-Detection Systems," J. Lightwave Technol. 37, 562-570 (2019)), we postulate that:

$$\frac{1}{ROSNR_{NL}} = \left[ F \cdot \frac{1}{OSNR_{SD}} \right]^n \qquad (19)$$

wherein F and n are arbitrary factors selected to provide a digital model of the relationship between $OSNR_{NL}$ and $OSNR_{SD}$. F represents a noise shape factor selected for taking into account the impact of the power range choice for the integration region NBW on a spectrally non-uniform distribution of $N_{SD}(\lambda)$. Exponent n is intended to allow adjustment of the relation for different nonlinear conditions associated with different system configurations (e.g. fiber types, chromatic dispersion and span lengths). A value of n can be obtained through relative optical spectrum measurements at commissioning. Since it acts as a normalization factor that should depend only on the above definition of $OSNR_{SD}$, the noise shape factor F is expected to be independent of the system configuration and can be retrieved from an initial calibration procedure on any system with known GOSNR conditions.

When the nonlinear noise is negligible in the reference spectral trace (condition 1), we obtain:

$$\frac{1}{OSNR_{NL2}} = \left[F \cdot \frac{1}{OSNR_{SD}}\right]^n$$

Once F and n are determined, the GOSNR can be obtained as:

$$1/GOSNR = 1/OSNR_{ASE} + [F \cdot 1/OSNR_{SD}]^n$$

Detailed Description of the Method:

Since it acts as a normalization factor that should depend only on the above definition of $OSNR_{SD}$, the noise shape factor F is expected to be independent of the system configuration and can be derived from an initial calibration procedure performed with any system with known GOSNR conditions.

The procedure for determining the exponent n is described as follows:

Step 1:

Using the Variable Optical Attenuator (VOA) 508, a reference lower transmitter total signal power and power distribution (between channels) are set to level $P_{Tx\text{-}ref}$.

Under this condition ("–ref"), the corresponding optical spectrum trace is acquired by the OSA 516 at receiver end to obtain:

$$P_{sum\text{-}ref}(\lambda) = P_{s\text{-}ref}(\lambda) + N_{ASE\text{-}ref} \quad (20)$$

Using the optical spectrum measurement, the ASE OSNR and/or the ASE noise level $N_{ASE\text{-}ref}$ may be determined by employing any method known in the art, such as the conventional ASE interpolation method, the conventional signal turn-off method, or a reference-based method for example, to derive a signal-only reference trace $P_{s\text{-}ref}(\lambda)$.

Step 2:

Using the Variable Optical Attenuator (VOA) 508, the transmitter total signal power is set to that of network operation conditions (condition "–op") and to another power level (condition "–an") around the operation power level (e.g., 1 to 2 dB higher).

For these conditions, respective optical spectrum traces, $P_{sum\text{-}op}(\lambda)$ and $P_{sum\text{-}an}(\lambda)$, are acquired and $OSNR_{ASE}$ measured as in step 1 to obtain $P_{s\text{-}op}(\lambda)$ and $P_{s\text{-}an}(\lambda)$, respectively.

Step 3:

For these conditions ("–op" and "–an"), the signal deformation optical signal to noise ratios, $OSNR_{SD\text{-}op}$ and $OSNR_{SD\text{-}an}$, are derived as follows.

Two optical differential spectrums are calculated as $$\Delta S_{SD\text{-}op}(\lambda) = P_{s\text{-}op}(\lambda) - k_{01} P_{s\text{-}ref}(\lambda) \quad (21a)$$

$$\Delta S_{SD\text{-}an}(\lambda) = P_{s\text{-}an}(\lambda) - k_{02} P_{s\text{-}ref}(\lambda) \quad (21b)$$

where $k_{01} = P_{s\text{-}op}(\lambda_{peak})/P_{s\text{-}ref}(\lambda_{peak})$ and $k_{02} = P_{s\text{-}an}(\lambda_{peak})/P_{s\text{-}ref}(\lambda_{peak})$ Then, the corresponding $OSNR_{SD\text{-}op}$ and $OSNR_{SD\text{-}an}$ are derived from the $OSNR_{SD}$ definition in equation (16) and (17).

Step 4:

For these conditions ("–op" and "–an"), the nonlinear optical signal to noise ratios, $OSNR_{NL\text{-}op}$ and $OSNR_{NL\text{-}an}$, are derived as follows.

From equations (18) and (19), we find:

$$1/OSNR_{NL\text{-}op} - 1/OSNR_{NL\text{-}ref} = (F/OSNR_{SD\text{-}op})^n \quad (22)$$

$$1/OSNR_{NL\text{-}an} - 1/OSNR_{NL\text{-}ref} = (F/OSNR_{SD\text{-}an})^n \quad (23)$$

Knowing from the Gaussian noise model for uncompensated optical fibers (see P. Pecci et al., "Experimental Characterization of Submarine "Open Cable" using Gaussian-noise Model and OSNRWET Parameter," Proc. OFC 2017, M2E.4), that non-linear effect impairments generally increase proportionally to the square signal power, we find:

$$OSNR_{NL\text{-}ref}/OSNR_{NL\text{-}op} = k_{01}^2 \quad (24)$$

$$OSNR_{NL\text{-}ref}/OSNR_{NL\text{-}an} = k_{02}^2 \quad (25)$$

Step 5:

The n parameter may then be found from equations (22) to (25) as:

$$n = [\text{Log}(k_{02}^2 - 1) - \text{Log}(k_{01}^2 - 1)]/[\text{Log}(OSNR_{SD\text{-}op}) - \text{Log}(OSNR_{SD\text{-}an})] \quad (26)$$

GOSNR:

Once exponent n is found as explained hereinabove and the noise shape factor F determined, and the $OSNR_{ASE\text{-}op}$ determined using the OSA 516 and employing any method known in the art, the GOSNR may be determined as follows.

Using the found exponent n and the F parameter, the nonlinear OSNR, $OSNR_{NL\text{-}op}$, may be derived from equations of (22) and (24).

And finally, from the measured OSNRASE and the determined OSNRNL, the GOSNR may be found using equation (6):

$$1/GOSNR_{op} = 1/OSNR_{ASE\text{-}op} + 1/OSNR_{NL\text{-}op} \quad (27)$$

If needed for the intended application, $OSNR_{NL\text{-}an}$ may be derived similarly from equations (23) and (25) and $GOSNR_{an}$ be found from the measured $OSNR_{ASE}$ and the determined $OSNR_{NL}$.

Combining Both Methods

It will be appreciated that the two methods described herein can also be advantageously combined. In some applications, the opto-electronic method may be applied at commissioning and the all-optical method be used for in-service monitoring. Advantageously, OSA acquisitions made at commissioning in steps 1 and 3 of the opto-electronic method can also be used for the all-optical method. These acquisitions can be used to derive the exponent n and the noise shape factor F and save a reference optical spectrum trace for later use in the all-optical method. Then, in in-service monitoring, an OSA acquisition is performed at operation conditions and the GOSNR derived as described herein.

Example of Computer System Architecture

Figure 6:
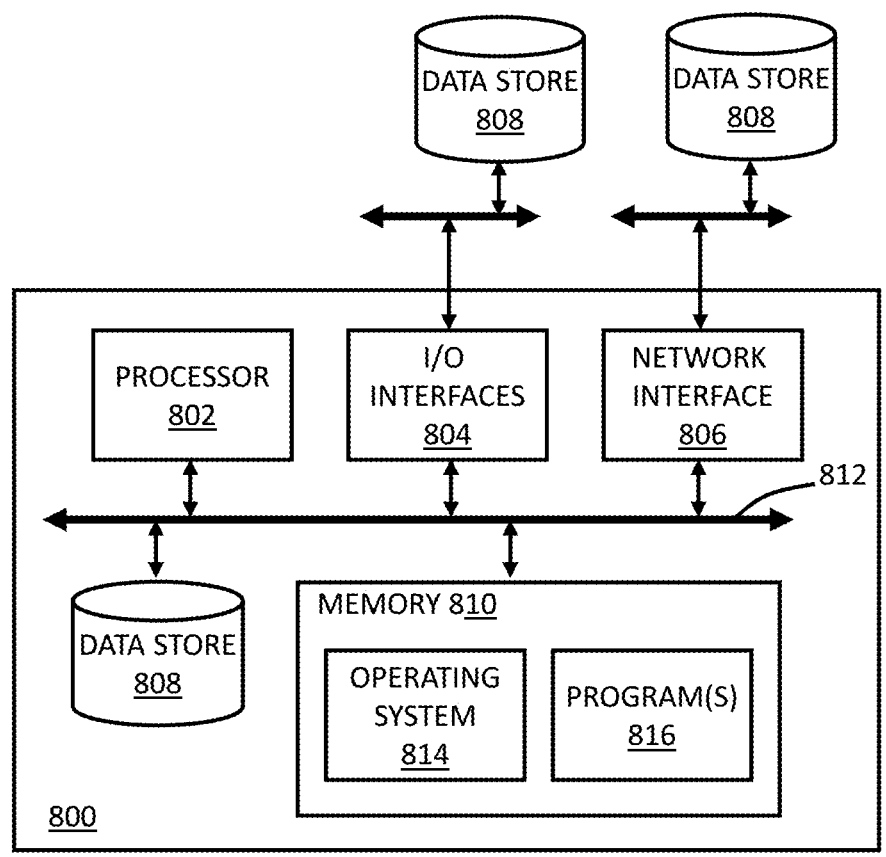
FIG. 6 is a block diagram illustrating an example architecture of a computer system used to implement the method of FIG. 3, in accordance with one embodiment.

Much of the software application that is used to implement the herein-described methods resides on and runs on a computer system, which in one embodiment, is a personal computer, workstation, or a computer system of an Optical Spectrum Analyzer device such as OSA 216 of FIG. 2. FIG. 6 is a block diagram of a computer system 800 which may be used to implement steps of the measurement method described hereinabove with reference to FIG. 3. In terms of hardware architecture, the computer system 800 generally includes a processor 802, input/output (I/O) interfaces 804, a network interface 806, a data store 808, and memory 810. It should be appreciated by those of ordinary skill in the art that FIG. 6 depicts the computer system 800 in a simplified manner, and a practical embodiment may include additional components and suitably configured processing logic to support known or conventional operating features that are not described in detail herein. A local interface 812 interconnects the major components. The local interface 812 may be, for example, but not limited to, one or more buses or other wired or wireless connections, as is known in the art. The local interface 812 may have additional elements, which are omitted for simplicity, such as controllers, buffers (caches), drivers, repeaters, and receivers, among many others, to enable communications. Further, the local interface 812 may include address, control, and/or data connections to enable appropriate communications among the aforementioned components.

The computer system 800 is controlled by the processor 802, which serves as the central processing unit (CPU) for the system. The processor 802 is a hardware device for executing software instructions. The processor 802 may comprise one or more processors, including central processing unit(s) (CPU), auxiliary processor(s) or generally any device for executing software instructions. When the computer system 800 is in operation, the processor 802 is configured to execute software stored within the memory 810, to communicate data to and from the memory 810, and to generally control operations of the computer system 800 pursuant to the software instructions. The I/O interfaces 804 may be used to receive user input from and/or for providing system output to one or more devices or components. The user input may be provided via, for example, a keyboard, touchpad, and/or a mouse. System output may be provided via a display device and a printer (not shown). I/O interfaces 804 may include, for example, a serial port, a parallel port, a Small Computer System Interface (SCSI), a Serial ATA (SATA), a fibre channel, Infiniband, iSCSI, a PCI Express interface (PCI-x), an Infrared (IR) interface, a Radio Frequency (RF) interface, a Universal Serial Bus (USB) interface, or the like.

The network interface 806 may be used to enable the computer system 800 to communicate over a computer network or the Internet. The network interface 806 may include, for example, an Ethernet card or adapter or a Wireless Local Area Network (WLAN) card or adapter. The network interface 806 may include address, control, and/or data connections to enable appropriate communications on the network. A data store 808 may be used to store data. The data store 808 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 808 may incorporate electronic, magnetic, optical, and/or other types of storage media. In one example, the data store 808 may be located internal to the computer system 800 such as, for example, an internal hard drive connected to the local interface 812 in the computer system 800. Additionally, in another embodiment, the data store 808 may be located external to the computer system 800 such as, for example, an external hard drive connected to the I/O interfaces 804 (e.g., SCSI or USB connection). In a further embodiment, the data store 808 may be connected to the computer system 800 through a network, such as, for example, a network attached file server.

The memory 810 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 810 may incorporate electronic, magnetic, optical, and/or other types of storage media. Note that the memory 810 may have a distributed architecture, where various components are situated remotely from one another, but can be accessed by the processor 802. The software in memory 810 may include one or more computer programs, each of which includes an ordered listing of executable instructions for implementing logical functions. The software in the memory 810 includes a suitable operating system (O/S) 814 and one or more computer programs 816. The operating system 814 essentially controls the execution of other computer programs, such as the one or more programs 816, and provides scheduling, input-output control, file and data management, memory management, and communication control and related services. The one or more programs 816 may be configured to implement the various processes, algorithms, methods, techniques, etc. described herein, such as the processing steps of the measurement method of FIG. 3.

It should be noted that the architecture of the computer system as shown in FIG. 6 is meant as an illustrative example only. Numerous types of computer systems are available and can be used to implement the computer system.

Example of OSA Device Architecture

Figure 7:
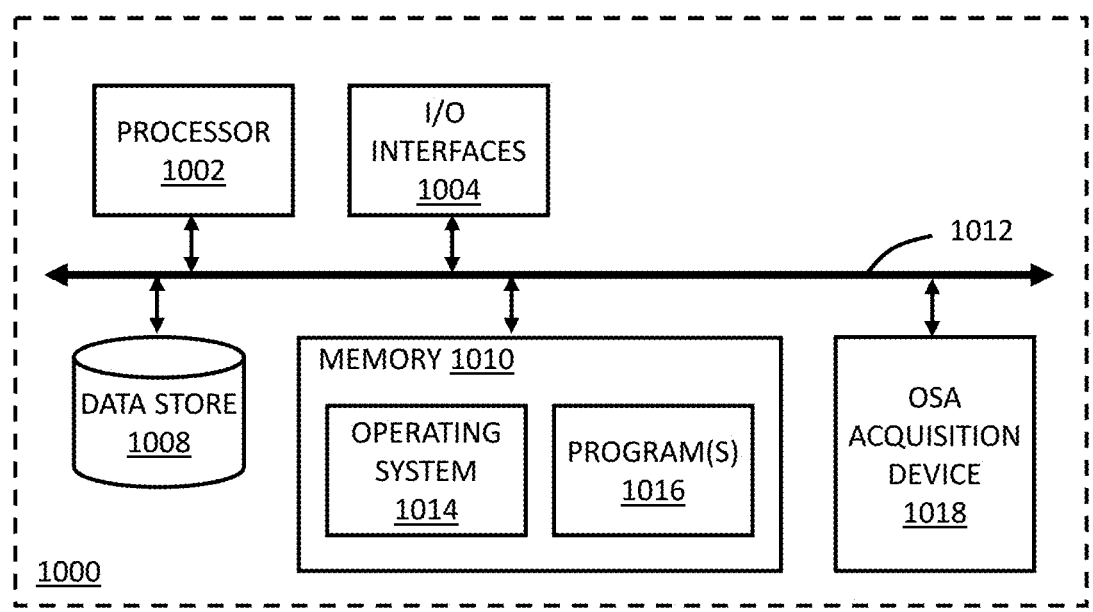
FIG. 7 is a block diagram illustrating an example architecture of an OSA device of the system of FIG. 2.

FIG. 7 is a block diagram of an OSA device 1000 which may be adapted to implement the measurement method of FIG. 3. The OSA device 1000 may comprise a digital device that, in terms of hardware architecture, generally includes a processor 1002, input/output (I/O) interfaces 1004, an optional radio 1006, a data store 1008, a memory 1010, as well as an optical test device including an OSA acquisition device 1018. It should be appreciated by those of ordinary skill in the art that FIG. 7 depicts the OSA device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the OSA device 1000 is in operation, the processor 1002 is configured to execute software stored within the memory 1010, to communicate data to and from the memory 1010, and to generally control operations of the OSA device 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the OSA device 1000 and/or output at least one of the values derived by the OSA analyzing module.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as OSA traces and OSA measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 7, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the OSA device 1000. For example, example programs 1016 may include a web browser to connect with a server for transferring OSA measurement data files, a dedicated OSA application configured to control OSA acquisitions by the OSA acquisition device 1018, set OSA configuration parameters, analyze OSA traces obtained by the OSA acquisition device 1018 and display a GUI related to the OSA device 1000. For example, the dedicated OSA application may embody an OSA analysis module configured to analyze acquired OSA traces in order to derive the GQm, the $OSNR_{NL}$ and/or the GOSNR over an optical communication link under test.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the OSA device 1000 via the radio 106. In such cases, at least some of the programs 1016 may be located in a memory of such a mobile device, for execution by a processor of the physically distinct device. The mobile may then also include a radio and be used to transfer OSA measurement data files toward a remote test application residing, e.g., on a server.

It should be noted that the OSA device shown in FIG. 7 is meant as an illustrative example only. Numerous types of computer systems are available and can be used to implement the OSA device.

The embodiments described above are intended to be exemplary only. The scope of the invention is therefore intended to be limited solely by the appended claims.

The invention claimed is:

1. A method for measuring at least one of the generalized signal quality metric $GQ_m$, the Generalized Optical Signal to Noise Ratio (GOSNR) characterizing linear and nonlinear noise over an optical communication link under test and the nonlinear Optical Signal to Noise Ratio ($OSNR_{NL}$) characterizing the nonlinear noise over the optical communication link under test, the method comprising:
at link operation conditions for which the $GQ_m$, the GOSNR and/or the $OSNR_{NL}$ is to be measured:
while using a pair of transmitter and receiver connected to opposite ends of the optical communication link under test, recording values of signal quality metric $Q_{m\text{-}tot\text{-}1}$, and recording values of signal power Ps-1 and ASE-noise Optical Signal to Noise Ratio ($OSNR_{ASE\text{-}1}$);
for at least two levels of signal power Ps-2 and Ps-3 that are different from the signal power Ps-1 of the link operation conditions:
while using said pair of transmitter and receiver connected to opposite ends of the optical communication link under test, recording values of signal quality metric $Q_{m\text{-}tot\text{-}2}$, $Q_{m\text{-}tot\text{-}3}$;
from values of signal quality metric recorded at varied signal power Ps-1, Ps-2 and Ps-3, deriving a value of a nonlinear contribution $Q_{NL\text{-}1}$ to the signal quality metric $Q_{m\text{-}tot\text{-}1}$, which result from non-linear noise in transmission over the optical transmission link; and
derive the $GQ_m$, the GOSNR and/or the $OSNR_{NL}$ from a constant value $R_{BW}$, said signal quality metric contribution $Q_{NL\text{-}1}$ and said $OSNR_{ASE\text{-}1}$.

2. The method as claimed in claim 1, wherein said constant value $R_{BW}$ is predetermined from a back-to-back calibration measurement.

3. The method as claimed in claim 1, further comprising:
while injecting additional ASE noise over the optical communication link under test:
while using said pair of transmitter and receiver connected to opposite ends of the optical communication link under test, recording values of signal quality metric $Q_{m\text{-}tot\text{-}add}$ and ASE-noise OSNR ($OSNR_{ASE\text{-}add}$); and
from recorded values of signal quality metric $Q_{m\text{-}tot\text{-}add}$ and recorded values of ASE-noise OSNR ($OSNR_{ASE\text{-}add}$), deriving the constant value $R_{BW}$ that relates the GOSNR to the signal quality metric GQ.

4. The method as claimed in claim 1,
for at least two values of signal power Ps-2 and Ps-3 that are different from the signal power Ps-1 of the link operation conditions:
while using said pair of transmitter and receiver connected to opposite ends of the optical communication link under test, further recording values of at least one of signal power (Ps-2, Ps-3) and ASE-noise Optical Signal to Noise Ratio ($OSNR_{ASE\text{-}2}$, $OSNR_{ASE\text{-}3}$).

5. The method as claimed in claim 3, wherein said constant value $R_{BW}$ is derived as:

$$R_{BW}=(1/\text{OSNR}_{ASE\text{-}add\text{-}1}/\text{OSNR}_{ASE\text{-}1})/(1/Q_{m\text{-}tot\text{-}add}-1/Q_{m\text{-}tot\text{-}1}).$$

6. The method as claimed in claim 1, wherein said GOSNR is derived as:

$$\text{GOSNR}_1^{-1}=\text{OSNR}_{ASE\text{-}1}^{-1}+R_{BW}/QN_{L\text{-}1}.$$

7. The method as claimed in claim 1, wherein said $\text{OSNR}_{NL}$ is derived as:

$$\text{OSNR}_{NL\text{-}1}=Q_{NL\text{-}1}/R_{BW}.$$

8. The method as claimed in claim 3, wherein values of signal quality metric, ASE-noise OSNR and signal power are recorded while using a system transmitter and a system receiver of the transmission system intended for the optical communication link under test.

9. The method as claimed in claim 1, wherein values of signal quality metric, ASE-noise OSNR and signal power are recorded while using a test transmitter and a test receiver which are distinct from a system transmitter and a system receiver of the transmission system that intended for the optical communication link under test.

10. The method as claimed in claim 1, wherein said transmitter and said receiver are commercial-grade.

11. A system for measuring at least one of the generalized signal quality metric ($GQ_m$), the Generalized Optical Signal to Noise Ratio (GOSNR) characterizing linear and nonlinear noise over an optical communication link under test and the nonlinear Optical Signal to Noise Ratio ($\text{OSNR}_{NL}$) characterizing the nonlinear noise over the optical communication link under test, the optical communication link under test having a transmitter end connected toward a transmitter and a receiver end connected toward a receiver, the system comprising:
  a variable optical attenuator connected between the transmitter and the optical communication link to vary a level of signal power in the optical communication link;
  an ASE source connected between the receiver end and the receiver, to inject additional ASE noise toward the receiver;
  an optical spectrum analyzer connected between the receiver end and the receiver, to measure values of ASE-noise Optical Signal to Noise Ratio;
  a processing unit configured for:
    receiving values of signal quality metric $Q_{m\text{-}tot\text{-}1}$, signal power Ps-1 and ASE-noise Optical Signal to Noise Ratio $\text{OSNR}_{ASE\text{-}1}$ recorded on the optical communication link under test, at link operation conditions for which the $GQ_m$, the GOSNR and/or the $\text{OSNR}_{NL}$ is to be determined;
    receiving values of signal quality metric $Q_{m\text{-}tot\text{-}2}$, $Q_{m\text{-}tot\text{-}3}$ recorded for at least two levels of signal power Ps-2 and Ps-3 that are different from the signal power Ps-1 of the link operation conditions;
    from values of signal quality metric recorded at varied signal power Ps-1, Ps-2 and Ps-3, deriving a value of a nonlinear contribution $Q_{NL\text{-}1}$ to the signal quality metric $Q_m$, which result from non-linear noise in transmission over the optical transmission link; and
    derive the $GQ_m$, the GOSNR and/or the $\text{OSNR}_{NL}$ from a constant value $R_{BW}$, said signal quality metric contribution $Q_{NL\text{-}1}$ and said ASE-noise OSNR $\text{OSNR}_{ASE\text{-}1}$.

12. The system as claimed in claim 11, wherein said constant value $R_{BW}$ is predetermined from a back-to-back calibration measurement.

13. The system as claimed in claim 11, wherein said processing unit is further configured for:
  receiving values of signal quality metric $Q_{m\text{-}tot\text{-}add}$ and ASE-noise OSNR $\text{OSNR}_{ASE\text{-}add}$ recorded on the optical communication link under test while injecting additional ASE noise using said ASE source;
  from recorded values of signal quality metric and recorded values of ASE-noise OSNR, deriving the constant value $R_{BW}$ that relates the GOSNR to the signal quality metric GQ.

14. The system as claimed in claim 11, receiving values of values of signal power Ps-2, Ps-3 and ASE-noise Optical Signal to Noise Ratio $\text{OSNR}_{ASE\text{-}2}$, $\text{OSNR}_{ASE\text{-}3}$ recorded on the optical communication link under test for at least two values of signal power Ps-2 and Ps-3 that are different from the signal power Ps-1 of the link operation conditions.

15. The system as claimed in claim 13, wherein said constant value $R_{BW}$ is derived as:

$$R_{BW}=(1/\text{OSNR}_{ASE\text{-}add}-1/\text{OSNR}_{ASE\text{-}1})/(1/Q_{m\text{-}tot\text{-}add}-1/Q_{m\text{-}tot\text{-}1}).$$

16. The system as claimed in claim 11, wherein said GOSNR is derived as:

$$\text{GOSNR}_1^{-1}=\text{OSNR}_{ASE\text{-}1}^{-1}+R_{BW}/Q_{NL\text{-}1}.$$

17. The system as claimed in claim 11, wherein said $\text{OSNR}_{NL}$ is derived as:

$$\text{OSNR}_{NL\text{-}1}=Q_{NL\text{-}1}/R_{BW}.$$

18. The system as claimed in claim 13, wherein said transmitter and said receiver comprise a system transmitter and a system receiver of the transmission system intended for the optical communication link under test.

19. The system as claimed in claim 11, wherein said transmitter and said receiver comprise a test transmitter and a test receiver that are distinct from a system transmitter and a system receiver of the transmission system intended for the optical communication link under test.

20. The system as claimed in claim 19, further comprising said test transmitter and said test receiver.

21. The system as claimed in claim 11, wherein said transmitter and said receiver are commercial-grade.

22. A non-transitory computer-readable storage medium comprising instructions that, when executed, cause a processor to perform the steps of:
  receiving values of signal quality metric $Q_{m\text{-}tot\text{-}1}$, signal power Ps-1 and ASE-noise Optical Signal to Noise Ratio $\text{OSNR}_{ASE\text{-}1}$ recorded on the optical communication link under test, at link operation conditions for which a $GQ_m$, a GOSNR and/or a $\text{OSNR}_{NL}$ is to be determined;
  receiving values of signal quality metric $Q_{m\text{-}tot\text{-}add}$ and ASE-noise OSNR $\text{OSNR}_{ASE\text{-}add}$ recorded on the optical communication link under test while injecting additional ASE noise using said ASE source;
  receiving values of signal quality metric $Q_{m\text{-}tot\text{-}2}$, $Q_{m\text{-}tot\text{-}3}$ recorded for at least two levels of signal power Ps-2 and Ps-3 that are different from the signal power Ps-1 of the link operation conditions;
  from recorded values $Q_{m\text{-}tot\text{-}1}$, $Q_{m\text{-}tot\text{-}add}$ of signal quality metric and recorded values $\text{OSNR}_{ASE\text{-}1}$ and $\text{OSNR}_{ASE\text{-}add}$ of ASE-noise OSNR, deriving a constant value $R_{BW}$ that relates the GOSNR to the signal quality metric GQ;
  from values of signal quality metric recorded at varied signal power Ps-1, Ps-2 and Ps-3, deriving a value of a nonlinear contribution $Q_{NL\text{-}1}$ to the signal quality metric $Q_m$, which result from non-linear noise in transmission over the optical transmission link; and derive the $GQ_m$, the GOSNR and/or the $OSNR_{NL}$ from the constant value $R_{BW}$, said signal quality metric contribution $Q_{NL-1}$ and said ASE-noise OSNR $OSNR_{ASE-1}$.

23. The non-transitory computer-readable storage medium as claim in claim 22, further comprising instructions that, when executed, cause a processor to perform the steps of:

receiving values of signal quality metric $Q_{m\text{-}tot\text{-}add}$ and ASE-noise OSNR $OSNR_{ASE\text{-}add}$ recorded on the optical communication link under test while injecting additional ASE noise using said ASE source;

from recorded values of signal quality metric and recorded values of ASE-noise OSNR, deriving the constant value $R_{BW}$ that relates the GOSNR to the signal quality metric GQ.

* * * * *